United States Patent [19]

Vitale

[11] Patent Number: 4,551,103

[45] Date of Patent: Nov. 5, 1985

[54] FARM PRODUCTS AGRICULTURAL GAME

[75] Inventor: Vincent J. Vitale, Detroit, Mich.

[73] Assignee: Mickey Green, Detroit, Mich.

[21] Appl. No.: 671,885

[22] Filed: Nov. 15, 1984

[51] Int. Cl.$^4$ ............... G09B 19/00; A63H 33/42
[52] U.S. Cl. ............................ 434/225; 446/424;
446/476
[58] Field of Search ............... 434/225; 446/423, 424,
446/476, 491

[56] References Cited

U.S. PATENT DOCUMENTS

| | | | |
|---|---|---|---|
| 1,921,027 | 8/1933 | Gilbert | 434/225 X |
| 2,036,802 | 4/1936 | Fleishman et al. | 446/423 |
| 2,686,385 | 8/1954 | Smith et al. | 446/424 X |
| 3,066,437 | 12/1962 | Cohn | 446/476 X |
| 3,071,890 | 1/1963 | Cohn | 446/424 X |
| 4,150,507 | 4/1979 | Ogasawara | 446/424 X |

*Primary Examiner*—William H. Grieb
*Attorney, Agent, or Firm*—Harry R. Dumont

[57] ABSTRACT

An educational toy that shows how watermelons and similar farm products are grown, harvested, and removed from the field in field trucks and taken to a packing shed where they are placed on conveyors and transferred to over the road trucks. These trucks take the melons to commission houses where they are put into wooden or cardboard bins. The bins are transferred to city trucks that finally deliver the melons to chain stores and fruit markets for sale. The various types of trucks and equipment are introduced at the appropriate time and all are manipulable by children in a teaching toy mode.

6 Claims, 12 Drawing Figures

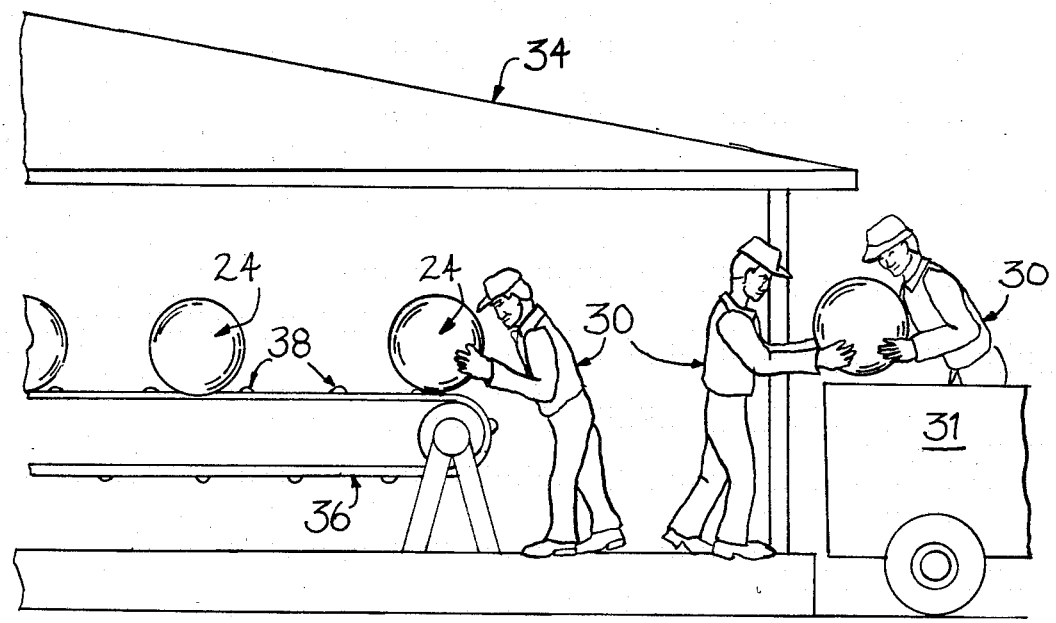
fig 5
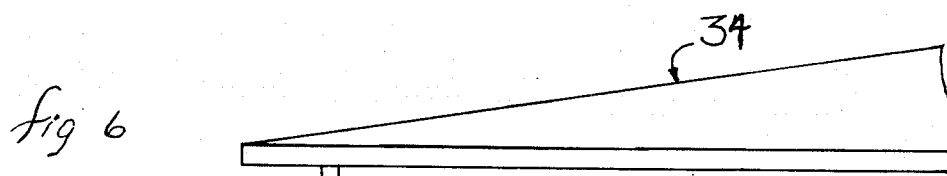
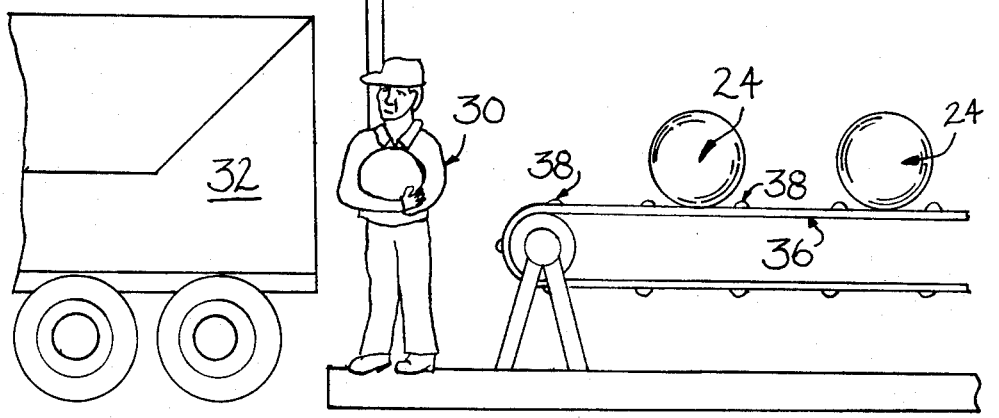
fig 6

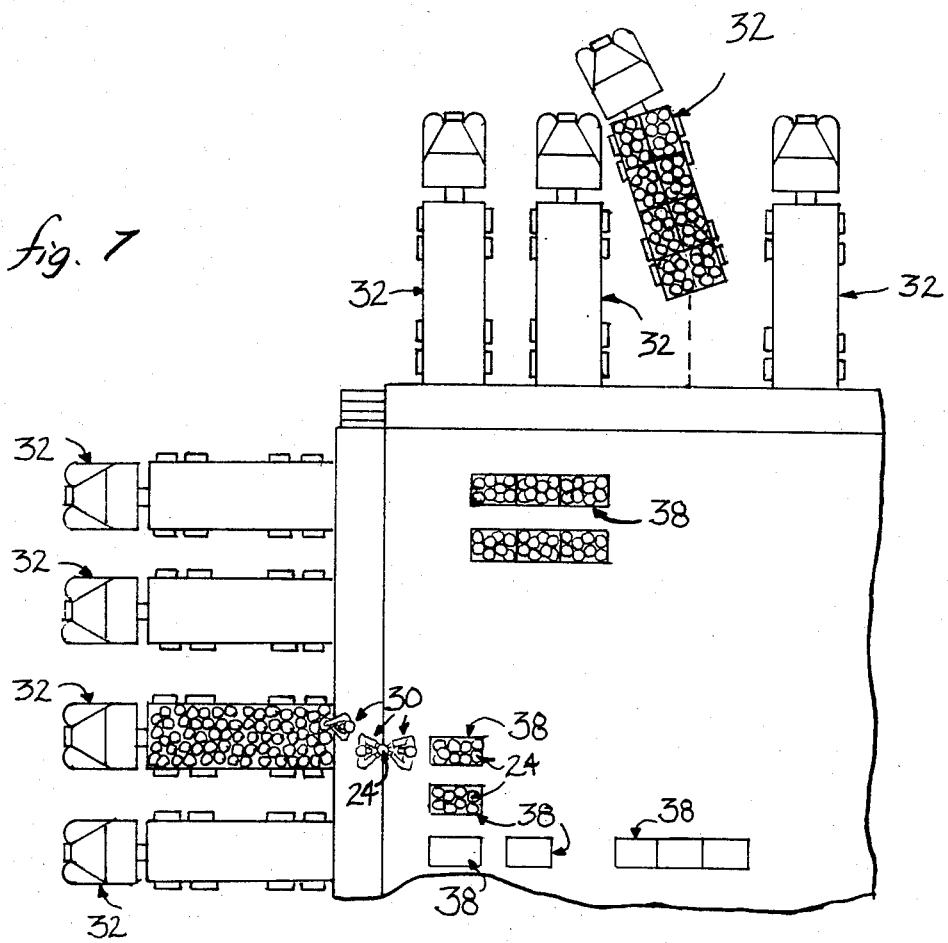
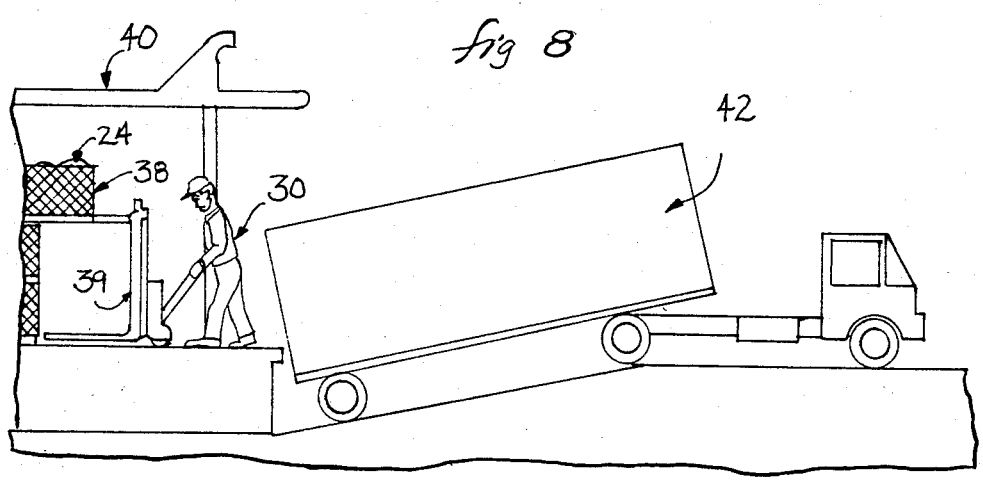

FARM PRODUCTS AGRICULTURAL GAME

BACKGROUND OF THE INVENTION

There is a problem in teaching city bred children how the produce that they see on the grocery shelves is harvested and handled and transported to the place where they see it on sale. There is a relatively complex procedure that starts with the growing of the melons in a field. By introducing the various parts of the process in a form that can be manipulated by the child, the value of the learning process is greatly magnified for him. By the introduction of the different types of trucks, the child learns to see and identify these on the road and the agricultural process becomes a real thing for him. It is the purpose of the toy to promote the education of the children by the use of an educational toy.

BRIEF DESCRIPTION OF THE DRAWINGS

The features and advantages of this invention will become apparent from the accompanying specifications and the drawings in which like numerals are used to refer to like parts as they may appear in the several views, and in which:

FIGS. 5 and 6 are elevational views showing transfer of melons from the field trucks by workmen to a conveyor to the over the road trucks;

FIG. 7 is a top plan view showing over the road trucks being unloaded at a commission house with the melons placed into bins;

FIG. 8 is a side elevational view showing bins being loaded onto city trucks;

SUMMARY OF THE INVENTION

The present invention relates to an educational toy that allows the simulation of melon growing and harvesting and the several steps of trucking involved in transferring the product from field trucks over to the highway trucks finally to delivery to city trucks that deliver to the place of sale. The apparatus involved is simple and can be assembled and used by a young child who is thus given an immediate introduction to the agricultural and distribution process. Because he can handle all these different articles the entire process becomes readily assimilated by the child as an active learning process as well as providing a toy that he can sit down and play with.

The watermelons are perferably embodied as green marbles which add to the realism of the game and are relatively durable to handle.

DETAILED DESCRIPTION OF THE PREFERRED EMBODIMENT

Figure 1:
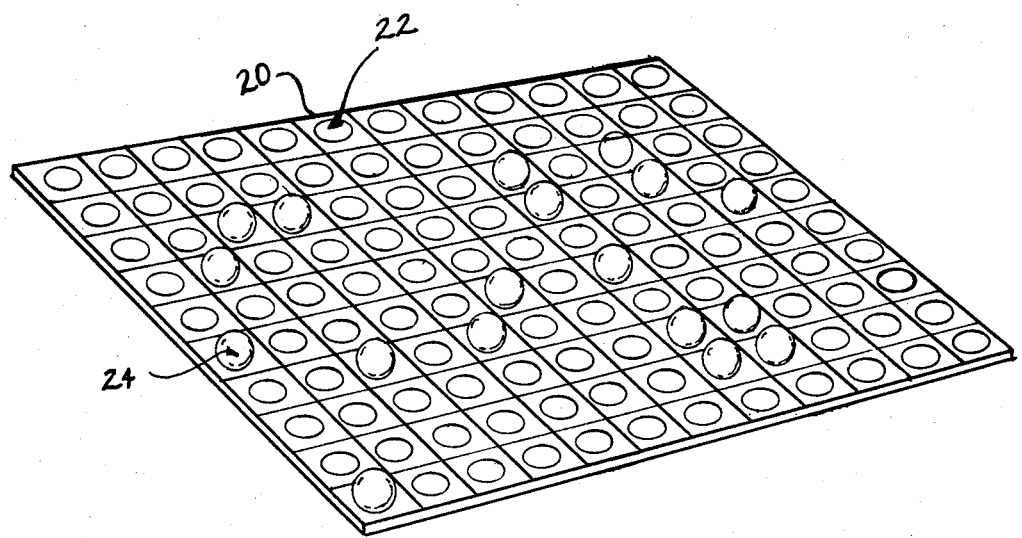
FIG. 1 is a perspective view showing a simulated melon growing field.
Figure 2:
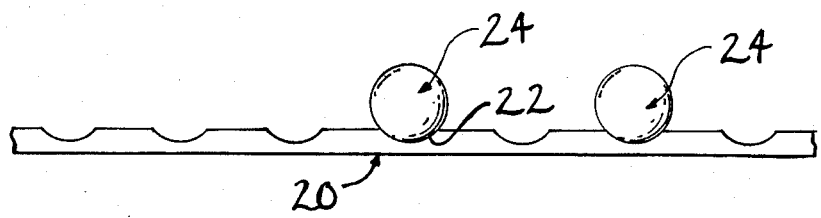
FIG. 2 is a side elevational view of the apparatus of FIG. 1.
Figure 3:
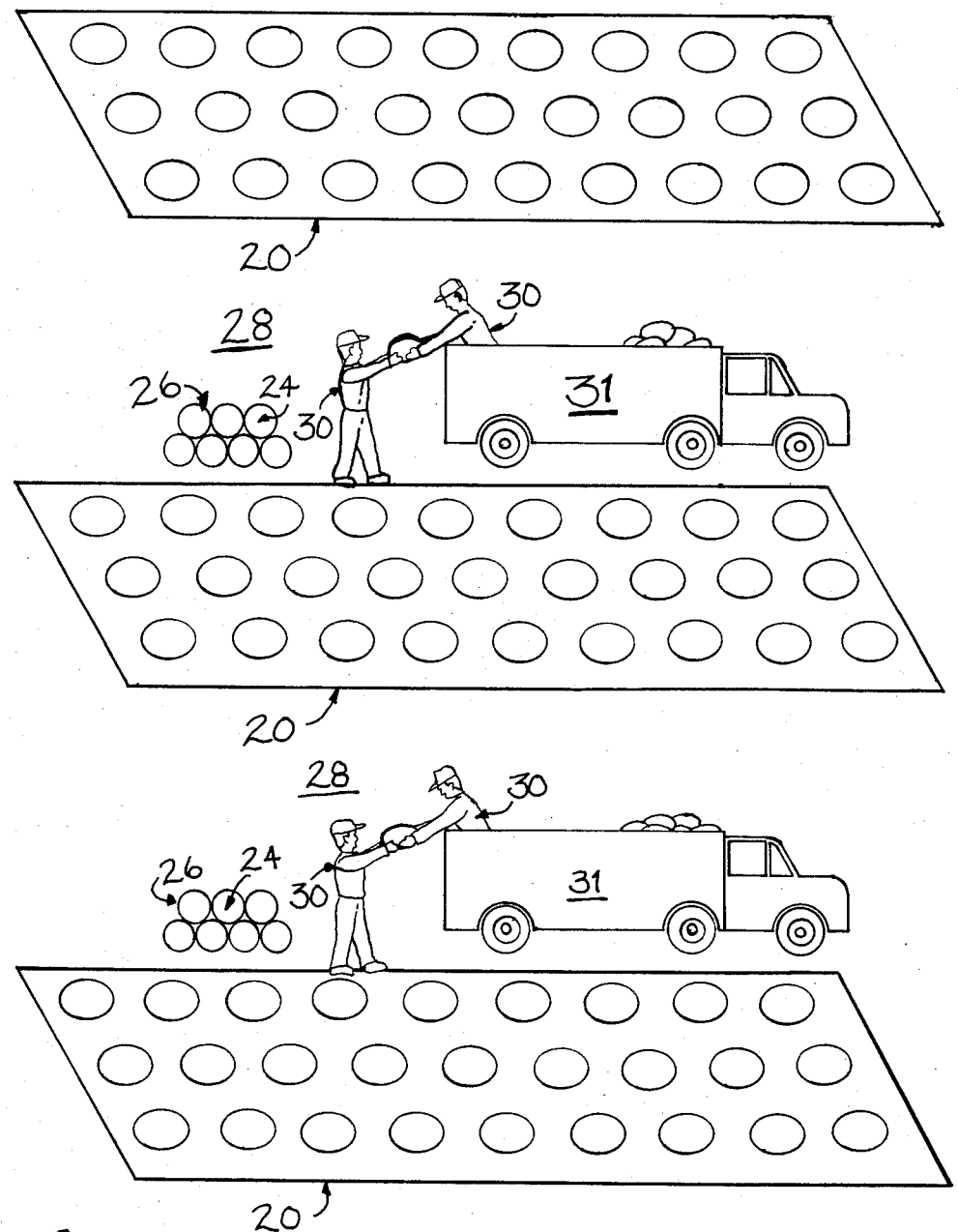
FIG. 3 is a perspective view showing several watermelon fields and the harvesting process.

FIGS. 1 and 2 show the simulated watermelon field in the form of a board 20. The melons 24 are located on depressions 22 formed in the field 20. FIG. 3 shows the setup by which a number of separate fields 20 are separated by roadways 28 so that field trucks 31 can be driven closely for pickup of the harvested melons. The melons 24 are removed from the fields and placed in piles 26. From the piles 26 it is possible for the child handling the toy to position the trucks as shown in the several drawings. Toy figures of men may be used to simulate the men harvesting and handling the melons who are identified by the numeral 30. An important feature of handling the melons is that they be subjected to careful handling only and this is made clear by the hand to hand passage of the melons as they are placed in the trucks 31.

Figure 4:
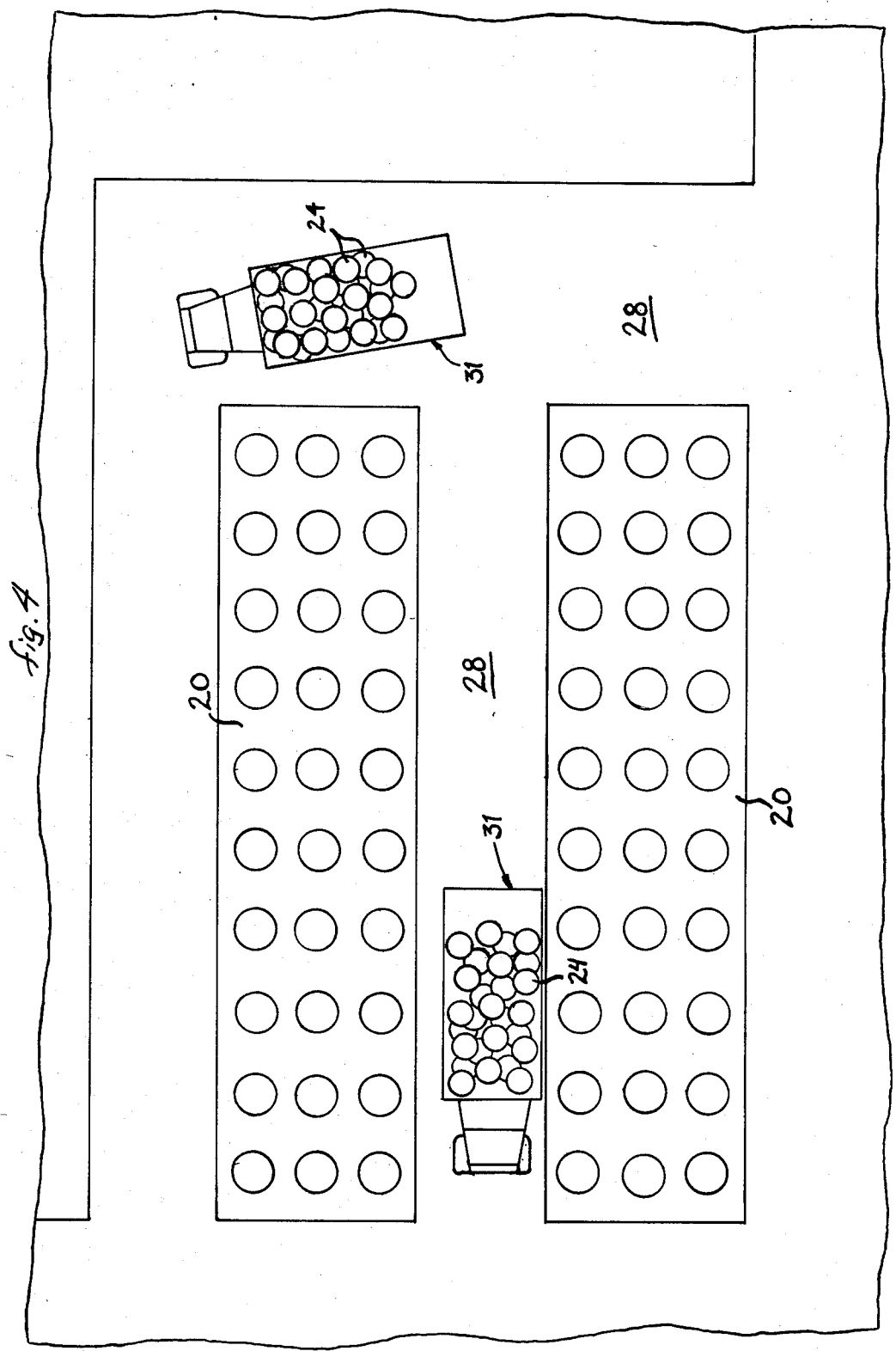
FIG. 4 is a top plan view showing the completion of the harvesting and the removal of the melons.

FIG. 4 shows the departure of the field trucks 31 loaded with melons along the roadways 28 in the direction of their destination which are packing sheds that will be shown in FIGS. 5 and 6, hereinafter. The fields 20 are left cleared of the melons 24 which have been carefully handled and depart on the trucks.

FIGS. 5 and 6 illustrate the manner in which the field trucks 31 are unloaded and the watermelons are finally placed on the over the road trucks 32 for shipment to distant cities. The packing shed 34 has mounted in it a motorized conveyor 36 which carries the melons 24. The conveyor 36 further includes a number of dividers 38 which separate the melons 24, one from the other, and prevent damage by rolling and bumping between them. Here again figures of men are disignated by the numeral 30 and they help to clarify the manner in which careful handling of the produce is insured.

FIG. 6 shows the end of the conveyor 36 which is also covered by the roof of the packing shed 34. The man 30 removes the melons as they come to him on the conveyor 36 and hands them to another man (not shown) in the over the road truck 32.

FIG. 7 is a view showing a plurality of over the road trucks 32, some of which are empty and others of which are being either backed into unload position of being unloaded. Bins 38 are used to receive the melons 24 for later transfer to city trucks 42 as shown in FIG. 8. Hydraulic lifts 34 are used to reach bins 38 when they are stacked.

The plurality of bins 38 are lined up in the commission house 40 preparatory to their being loaded with melons 24. A number of men 30 are shown loading the bins 38 from an over the road truck 32. It will be understood that the bins 38 are preferably fabricated from wood or cardboard or even wire materials which will provide the least possible damage by bruising to the watermelons as they are loaded or taken out of the bins.

FIG. 8 illustrates the manner in which the bins are being loaded into city trucks 42. It will be seen that the city trucks 42 are somewhat shorter in length than the over the road trucks 32 making it easier for them to be driven and unloaded in the city at the various points of retail such a grocery stores and fruit markets.

Figure 9:
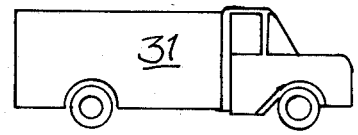
FIGS. 9, 10, and 11 are side elevational view respectively of field, city, and over the road trucks.
Figure 10:
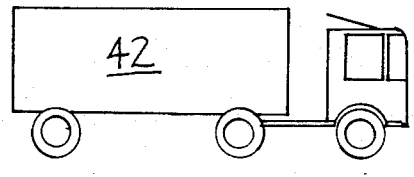
Figure 11:
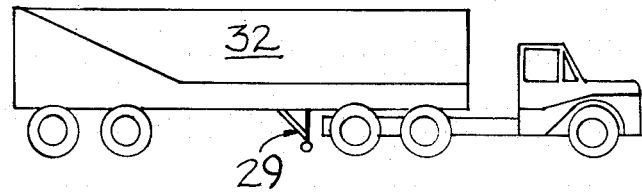

The various trucks are shown in FIGS 9-11. The field trucks 31 are used to drive right up to the melon fields as shown in FIG. 3. They are relatively light weight, open trucks. City trucks 42 are closed semi trucks for short distance hauling. The over the road trucks 32 are large semi type trucks with trailer and attached foot 29. They are adapted for long distance hauling.

Figure 12:
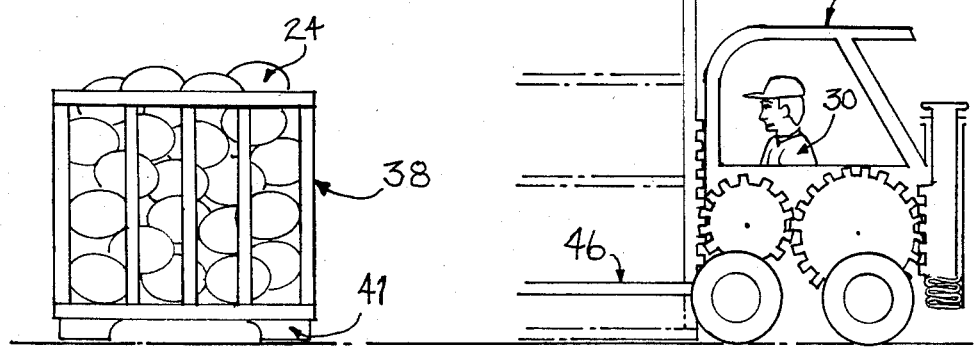
FIG. 12 is an elevational view showing city trucks being unloaded at a chain store by a hi-lo tractor.

FIG. 12 shows a full bin 38 with attached pallet 41. A hi-lo 44 is operated to remove the bins from one of the city trucks 42 to a grocery store for sale. The hi-lo 44 includes a fork 46 that is used to engage below the pallet 41 and lift the bin 38 for moving it to the desired location.

It will thus be seen that I have provided by our invention an improved toy of the educational type. Children are introduced to handling methods for agricultural products. The complete story of the growing and handling of the watermelons is set forth by the use of figures simulating the men and by distinctly different types of trucks as they are introduced and used in the process. Modern techniques for shipment in bulk and handling perishable agricultural products are clarified to the children. Because of the nature of the marbles simulating the melons, they can be handled and removed from one article to the other by the child.

I claim:

1. A watermelon agriculture educational toy, comprising:
   a board with spaced indentations for simulating a melon growing field;
   a plurality of marbles placed in some of said indentations for simulating melons;
   a set-up for manual removal of said marbles from said indentations; said set-up including a field truck model;
   a second set-up for receiving of said marbles from said field trucks including a packing shed;
   a belt conveyor positioned in said packing shed for removing said marbles from said field truck;
   an over the road truck model parked alongside the said packing shed for receiving said marbles from said conveyor;
   a commission house at a distant point for receiving said marbles from said over the road truck;
   a plurality of bins positioned in said commission house for holding said marbles;
   a city truck model parked next to said commission house; and
   means for moving said bus into said city truck for delivery to retail stores.

2. The combination as set forth in claim 1 in which said last means comprises a hydraulic lift.

3. The combination as set forth in claim 1 in which said bins are fabricated of a wooden material.

4. The combination as set forth in claim 1 in which said bins are fabricated of a carboard material.

5. The combination as set forth in claim 1 in which said bins are fabricated from a wire mesh.

6. The combination as set forth in claim 1 in which a plurality of figures of men are included in said set-ups.

* * * * *

UNITED STATES PATENT OFFICE

CERTIFICATE OF CORRECTION

Patent No. 4,551,103      Dated Nov 5, 1985

Inventor (s) Vincent J. Vitale

It is certified that error appears in the above-identified patent and that said Letters Patent and hereby corrected as shown below:

IN THE CLAIMS:

Claim 1, Line 14, before "into" delete "bus", and substitute therefor - - bins - -.

Signed and Sealed this

Fourteenth Day of January 1986

[SEAL]

Attest:

DONALD J. QUIGG

Attesting Officer      Commissioner of Patents and Trademarks